United States Patent [19]
Bristow et al.

[11] Patent Number: 5,892,866
[45] Date of Patent: Apr. 6, 1999

[54] FIBER OPTIC MODE SCRAMBLER

[75] Inventors: Julian P. Bristow, Lakeville; John A. Lehman, St. Paul, both of Minn.

[73] Assignee: Honeywell Inc., Minneapolis, Minn.

[21] Appl. No.: 723,600

[22] Filed: Oct. 1, 1996

[51] Int. Cl.$^6$ .................................................. G02B 6/26
[52] U.S. Cl. ............................................. 385/28; 385/37
[58] Field of Search ............................... 385/24, 27, 28, 385/29, 31, 37, 124, 10; 372/6, 102

[56] References Cited

U.S. PATENT DOCUMENTS

| | | |
|---|---|---|
| 4,281,893 | 8/1981 | Yamada et al. . |
| 4,768,853 | 9/1988 | Bhagavatula ............................. 385/31 |
| 5,422,897 | 6/1995 | Wyatt et al. ................................ 372/6 |

OTHER PUBLICATIONS

Dubois, et al., "Selective Mode Excitation in Graded–Index Multimode Fiber by a Computer–Generated Optical Mask," *Optic Letters*, vol. 19, No. 7, Apr. 1, 1194, pp. 433–435.

Kazuhisa, "Mode Scrambler,"*Patents Abstracts of Japan*, Publ. No. 59062803, Oct. 4, 1984.

Yoshikawa, et al., letter entitled "Single–Mode Separation for Mode–Division Multiplexing by Holographic Filter" *IEICE Transactions on Electronics*, vol. E77–C, No. 9, Sep. 1994, pp. 1526–1527.

Article entitled "New Iterative Algorithm For The Design of Phase–Only Gratings" by Michael W. Farn of MIT/Lincoln Labortory, L–265, address 244 Wood Street, Lexington, MA 02173–9108 found in SPIE vol. 1555 Computer and Optically Generated Holographic Optics (Fourth in a Series) (1991), pp. 34–42.

Article entitled "Modal Noise Causes and Cures"by Richard E. Epworth, Standard Telecommunication Laboratories Ltd., Harlow, England CM17 9NA (Sep. 1981), pp. 109–115.

*Primary Examiner*—Hemang Sanghavi
*Attorney, Agent, or Firm*—Charles J. Ungemach; Brett A. Carlson

[57] ABSTRACT

The present invention is an optical transmission system comprising an optical source, a first lens and a second lens, a multimode optical waveguide, and a phase-only filter. The optical source generates an optical signal having a predetermined wavelength which is received by the first lens. The signal is then sent from the first lens through the phase-only filter and then to the second lens. The second lens then focuses the signal into the multimode optical waveguide. The multimode optical waveguide has predetermined dimensions and has multiple modes. The phase-only filter excites a plurality of modes in the optical waveguide to approximate equilibrium modal power distribution as the optical signal is received into the optical waveguide.

12 Claims, 2 Drawing Sheets

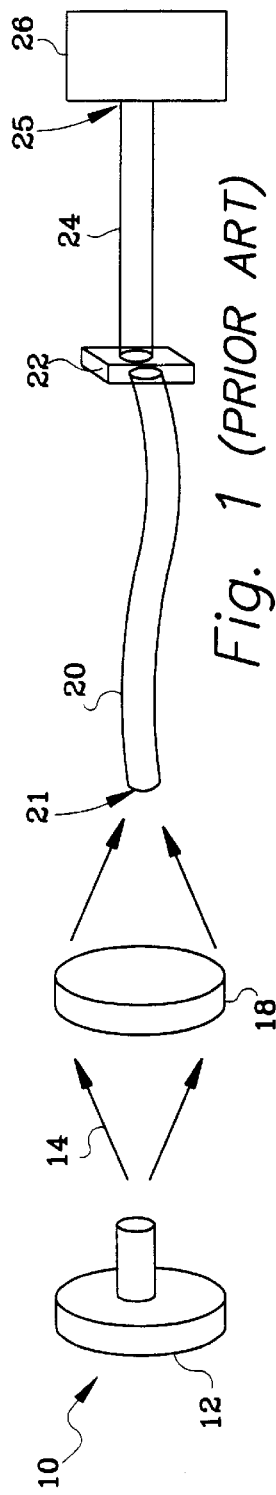
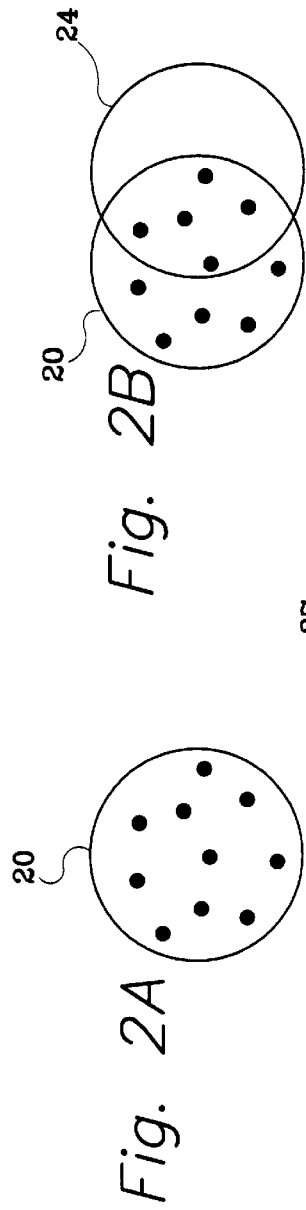
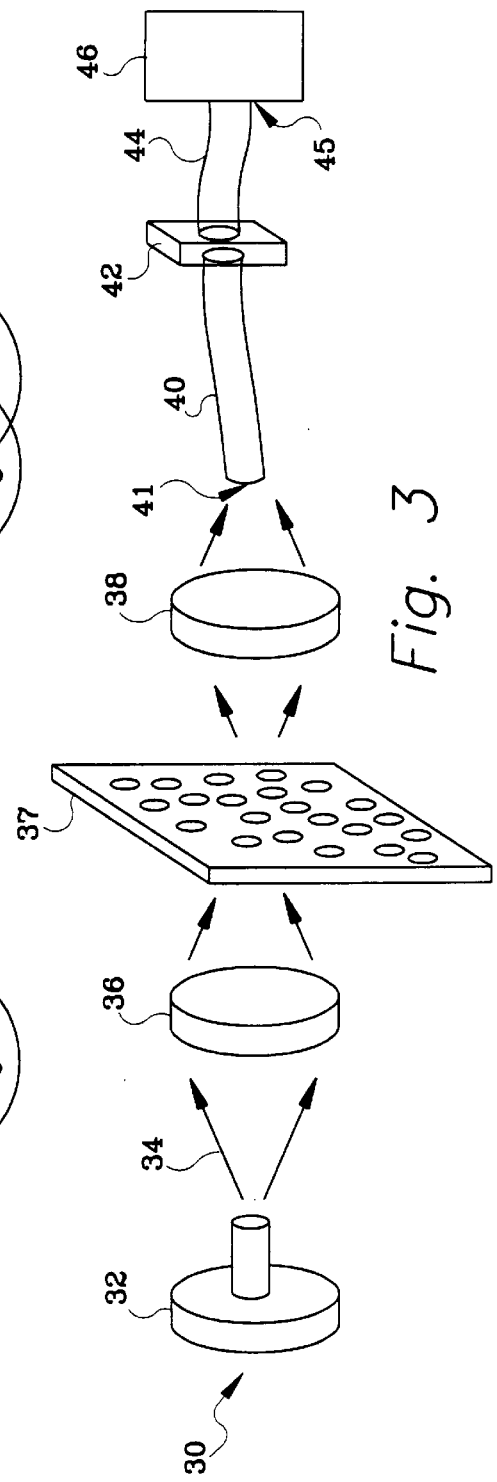

FIBER OPTIC MODE SCRAMBLER

BACKGROUND OF THE INVENTION

The present invention relates to an optical transmission system. More particularly, the invention relates to a high reliability fiber optic mode scrambler utilizing a phase-only filter.

Guided optical transmission systems are well known systems for rapid and highly reliable transmission of information. The basic guided optical transmission system consists of a transmitter, a receiver, and a guided channel connecting the two. Typically, an optical signal is introduced to the guided channel by the transmitter, travels through the guided channel and is then detected by the receiver.

Furthermore, a typical guided optical transmission system will include multiple guided channels, such as optical fibers, which are connected with connector elements. Such fiber-to-fiber connections are needed for a variety of reasons. Several fibers must be spliced together for lengths of more than a few hundred kilometers because only limited continuous lengths of fiber are normally available from manufacturers. Also, moderate lengths of fiber are easier to install in most applications than are very long cables.

Transmitters in typical guided optical transmission systems are either light emitting diodes (LEDs) or laser diodes (lasers). An LED is a pn junction semiconductor that emits light when forward biased. LEDs are incoherent light sources. Typical LEDs do not emit great amounts of power and are relatively slow. On the other hand, lasers have significantly more power and can be operated much faster. Lasers are coherent light sources.

The guided channel in a typical guided optical transmission system is a step-index fiber consisting of a central core with a designated refractive index surrounded by a cladding with a lower designated refractive index. Step-index fibers have three common forms: a glass core, cladded with a glass having a slightly lower refractive index; a silica glass core, cladded with plastic; and a plastic core, cladded with another plastic. The core/cladding interface allows a properly oriented optical signal to propagate within the core of the fiber with nearly total internal reflection, that is, none of the signal leaks into the cladding. As long as the signal enters the core of the fiber at an angle less than the critical angle, nearly all of the signal will remain in the core of the fiber so that there is little loss in the optical signal.

The fiber in a guided optical transmission system can be a single mode fiber or a multimode fiber. The multimode fiber has a multitude of transmission modes in which an optical signal can travel while the single mode fiber has only one transmission mode for an optical signal. The advantage of a multimode fiber is that significantly more information can be transmitted through the multimode fiber. A single mode fiber, limited to a single mode of transmission, is able to transmit much less information than a multimode fiber.

Most applications in which optical transmission systems are used require the extremely rapid transmission of data. Often, speed considerations will dictate that a laser source is necessary, as is the use of a multimode fiber so that more information can be transmitted at the same time. In addition, as stated above, most practical applications will require multiple fiber lengths utilizing connectors. The combination of highly coherent laser sources with a multimode fiber utilizing connector elements presents several problems.

Modal noise is one difficulty in such guided optical systems. When highly coherent light sources such as laser diodes are used with multimode fibers, the coherent source excites very few modes in the fiber. However, the fiber modes then interfere with one another causing random variations in optic power. This random power variation is known as modal noise. With typical LED sources, mode interference is not a problem because the light is so incoherent that interference will not greatly affect the overall power detection. However, with highly coherent light sources such as lasers, the modal interference can be both additive and subtractive such that any one of the few modes transmitting the optical signal can have a very significant portion of the optical power concentrated in that one mode.

This concentration in a single mode becomes extremely significant in systems which utilize mode-selective loss elements such as connectors. These connectors between the fibers cause losses in the optical signal. It is very difficult to perfectly align the fibers, even with the use of connector elements. Even slight misalignment of the cores of the fibers will cause mode-selective loss. Elements such as connectors are therefore sometimes called mode-selective loss elements. Certain transmission modes are cut off or terminated by these elements. Thus, such connectors may cause a signal to lose its higher order modes. When the terminated modes are carrying a significant amount of the optical signal power, there will be signal error at the detector. Consequently, multimode fibers cannot be used in many high speed applications.

One approach to overcoming these problems has been to use mode scramblers with corrugated surfaces to microbend the fibers. Such corrugated mode scramblers physically bend the fiber such that the angle of reflection between the signal and the core/cladding interface will be altered as the signal passes through the portion of the fiber which is bent by the corrugated mode scrambler. In this way, the optical signal will be reflected into many more modes than the few in which the coherent laser source originally transmits the signal. Thus, the corrugated scrambler can approximate equilibrium power distribution in the fiber.

By approximating equilibrium power distribution the effect of mode-selective loss element such as connecters are greatly lessened. When there are only a few modes in which the optical signal is traveling, any modes cut off by the mode selective loss elements will greatly diminish the overall signal power and cause error in detection. When more modes are utilized, however, each mode terminated by the mode-selective loss elements has much less impact.

Despite the advantages of such corrugated mode scramblers, there are many limitations to these devices, and their usefulness is very limited. First, corrugated mode scramblers impose intolerable strain on the fiber. In order for the corrugated scrambler to be effective, significant strain must be put on the fiber. The corrugated scrambler alters the angle of reflection between the core/cladding interface by physically bending the fiber. This bending stretches one side of the fiber and places tension on the other. In most applications this strain is intolerable. Most fibers are comprised of glass or plastic. Any strain on these fibers increases the risk that they will break. Even slight bends in fiber can cause cracks. These cracks can affect the optical signal traveling through the fiber and will eventually lead to breakage of the fiber. A broken or cracked fiber will not properly transmit an optical signal.

Second, in order for the corrugated scrambler to effectively approximate equilibrium power distribution in the fiber, multiple bends in the fiber are necessary. The fiber must be subjected to a series of alternating bends. The package size needed to contain these plurality of bends is too large for many practical implementations. Consequently, the corrugated scrambler has limited practical usefulness.

The present invention is an optical transmission system which solves these and related problems in the prior art.

SUMMARY OF THE INVENTION

The present invention is an optical transmission system comprising an optical source, which generates an optical signal, a first lens, a second lens, a multimode optical waveguide, a phase-only filter, and a detector. The phase-only filter is utilized in the transmission system to approximate equilibrium power distribution in the multimode optical waveguide. Approximation of equilibrium power distribution decreases the affect of mode selective loss elements, thereby avoiding errors in detecting the optical signal.

BRIEF DESCRIPTION OF THE DRAWINGS

FIG. 1 is a diagram representing an overview of a prior art fiber optic transmission system.

FIGS. 2A and 2B show a fiber end speckle pattern and misaligned fiber cores, respectively.

FIG. 3 shows an embodiment of the present invention including a phase-only filter in a fiber optic transmission system.

DETAILED DESCRIPTION OF THE PREFERRED EMBODIMENTS

Figure 4:
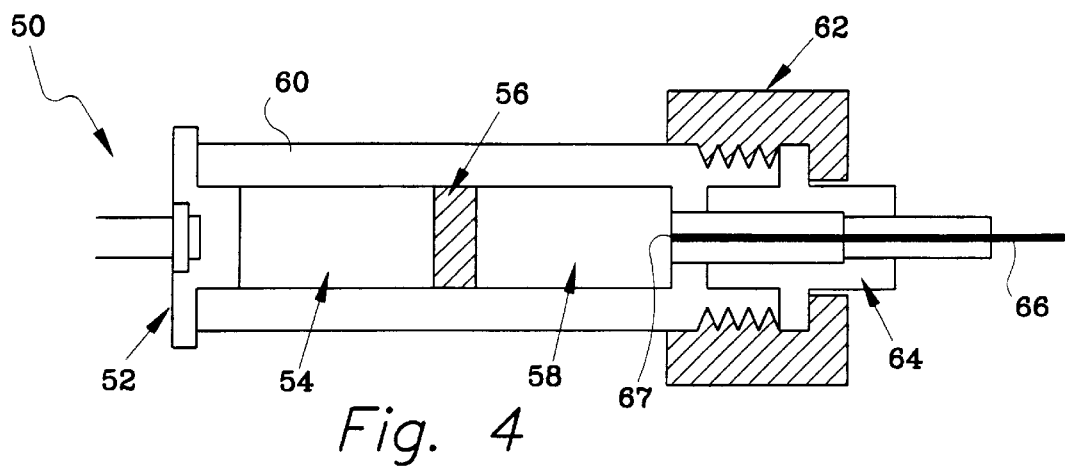
FIGS. 4 and 5 show cross-sectional and perspective views, respectively of an alternative embodiment of the present invention including a phase-only filter.

FIG. 1 is an overview of prior art fiber optic transmission system 10. Prior art fiber optic transmission system 10 includes laser diode 12, optical signal 14, lens 18, first fiber 20 with launch end 21, connecter 22, second fiber 24 with detection end 25, and detector 26.

Laser diode 12 of prior art fiber optic transmission system 10 generates optical signal 14 which is transmitted through lens 18. Lens 18 directs optical signal 14 into first fiber 20 at launch end 21, through connecter 22, and into second fiber 24. Optical signal 14 eventually reaches detection end 25 of fiber 24 and is detected by detector 26. Fibers 20 and 24 are multimode fibers, capable of supporting multiple modes of transmission.

Laser diode 12 is a highly coherent light source. Thus, optical signal 14 which is transmitted through lens 18 into first fiber 20 is transmitted into very few modes in fiber 20 at launch end 21. These modes tend to interfere with one another as optical signal 14 propagates from launch end 21 to detection end 25. This modal interference, also known as modal noise, can potentially cause errors in optical signal 14 at detector 26. This is particularly true if detection of optical signal 14 occurs before equilibrium power distribution is reached in fiber 20. Since detector 26 typically is located a relatively short distance along fiber 20, a few hundred meters or less, equilibrium power distribution will not be reached and errors in optical signal 14 will occur at detector 26.

Errors in optical signal 14 will occur at detector 26 due to mode-selective loss elements like connector 22. Connecter 22 will cause slight core misalignment between fibers 20 and 24. Such misalignment will cause mode selective loss. Certain modes, usually higher order modes, will be cut off and lost by connecter 22. This mode selective loss will eliminate a significant portion of optical signal 14 at connector 22. Thus, the lost portion of signal 14 will never be transmitted into fiber 24. This will cause errors to be detected by detector 26.

FIG. 2A shows a fiber speckle pattern, and FIG. 2B shows misaligned fiber cores. FIG. 2A illustrates a speckle pattern caused by the fiber modes interfering with one another. The spots are bright where the net interference is additive (in-phase modal fields) and dark where the net interference is subtractive (out-of-phase modal fields). As is evident from FIG. 2B, misalignment of the core causes mode selective loss, that is, certain modes from first fiber 20 will be terminated at connecter 22 and not transmitted to second fiber 24. This mode selective loss will likely cause errors in signal detection by detector 22 since significant optical signal power is lost at connecter 22.

FIG. 3 shows fiber optic transmission system 30 in accordance with the present invention. Fiber optic transmission system 30 includes laser diode 32, optical signal 34, first lens 36, phase-only filter 37, second lens 38, first fiber 40 with launch end 41, connecter 42, second fiber 44 with detection end 45, and detector 46.

Laser diode 32 of fiber optic transmission system 30 generates optical signal 34. Optical signal 34 is transmitted through first lens 36. First lens 36 directs optical signal 34 through phase-only filter 37 to second lens 38. Second lens 38 directs optical signal 34 into first fiber 40 at launch end 41, through connecter 42, and into second fiber 44. Optical signal 34 is eventually detected at detection end 45 of fiber 44 by detector 46. Fibers 40 and 44 are multimode fibers, capable of supporting multiple modes of transmission.

Laser diode 32 is a highly coherent light source. Thus, optical signal 34 would excite only a few modes in multimode first fiber 40 if signal 34 were transmitted directly to first fiber 40 at launch end 41. Thus, mode-selective loss at connecter 42 would greatly affect optical signal 34 and cause errors at detection as is the case in system 10. Optical signal 34 is transmitted through phase-only filter 37, however, before being transmitted into first fiber 40 at launch end 41. Phase-only filter 37 affects and alters optical signal 34 such that large number of modes are excited in first fiber 40 at launch end 41. Optic signal 34 is a single beam source. Phase-only filter 37 is a phase grating medium which diffracts the single beam of optic signal 34 into many modes of first fiber 40 (through second lens 38). Phase-only filter 37 causes optical signal 34 to approximate equilibrium power distribution at launch end 41. Consequently, any mode-selective loss at connector 42 will not cause errors in the detection of optical signal 34.

Consequently, as optical signal 34 propagates from launch end 41 toward detection end 45 and passes through connector 42, the mode-selective loss characteristics of connector 42 will not cause errors in detection at detector 46. Because equilibrium power distribution is achieved at launch end 41, optical signal 34 is sufficiently distributed among the multiple modes of fibers 40 and 44 so that the termination of some of those modes by connecter 42 will not significantly affect the detection of optical signal 34. Thus, there will be no errors in detection.

Phase-only filter 37 is a fully transparent phase grating surface. It may be comprised of glass, plastic, silica or similar material. Phase-only filter 37 slightly adjusts the wavelength of optical signal 34 in order to appropriately diffract optical signal 34 into many modes of first fiber 40 at launch end 41. Phase-only filter 37 is constructed based on the wavelength of optical signal 34 as it is generated by laser diode 32, the relative distances between laser diode 34, first lens 36, second lens 38, and launch end 41 of first fiber 40, and also on the physical make-up of fibers 40 and 44 such as core diameter and refractive index.

Those skilled in the art will recognize that LaPlace Transforms can be used to construct a phase-only filter based on such criteria. A description of the design of such a phase-only filter can be found in an article by Michael W. Farn entitled "New Iterative Algorithm For The Design Of Phase-Only Gratings," SPIE Vol. 1555 Computer and Optically Generated Holographic Optics (Fourth in a Series) (1991), which is incorporated herein by reference.

In an alternative embodiment, an amplitude grating can be substituted for phase-only filter 37. An amplitude grating can also be constructed to diffract optical signal 34 into many modes at launch end 41. However, an amplitude grating is usually not as desirable as its construction comprises the alternation of transparent and opaque surfaces. Thus, at least some portion of signal 34 is lost in the transmission through the amplitude grating (due to the opaque surfaces of the grating). This may lead to loss in power and error in detection of the signal.

Figure 5:
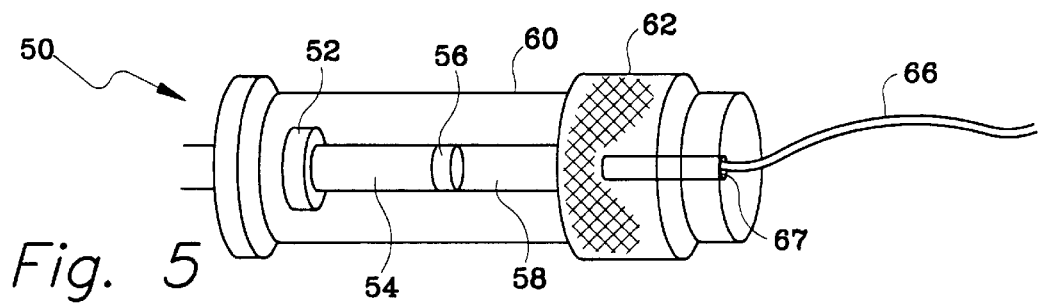

FIGS. 4 and 5 show an implementation of the present invention including a phase-only filter. FIG. 4 shows a cross-sectional view and FIG. 5 shows a perspective view. Phase-only filter package 50 is shown including laser diode 52, first gradient index lens 54, phase-only filter 56, second gradient index lens 58, housing 60, locking nut 62, fiber optic connector 64, and fiber 66.

Phase-only filter package 50 is a self-contained laser package that utilizes highly coherent laser diode 52 to generate a signal in multimode fiber 66 that approximates equilibrium power distribution at transmitting end 67 of the fiber.

Laser diode 52 generates a optical signal (not shown) according to an electronic input signal. The optical signal is directed through first lens 54, phase-only filter 56, and then through second lens 58. Housing 60 is cylindrical and substantially contains first lens 54, phase-only filter 56, and second lens 58. Fiber optic connector 64 grasps fiber 66 and is placed in housing 60 at an opposite end of laser diode 52. Locking nut 62 surrounds connecter 64 and screws onto housing 60. Housing 60 includes external threads that interlock with internal threads from locking nut 62.

Phase-only filter package 50 is especially advantageous as a source that can be installed into many applications. It provides an extremely high-speed optical source that can be used with multimode fibers.

Figure 6:
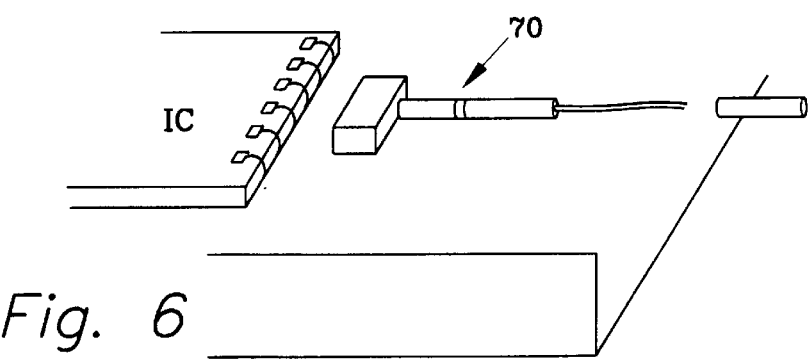
FIG. 6 shows an alternative embodiment of the present invention including a phase-only filter.

FIG. 6 shows an alternative implementation of the present invention. Phase-only filter package 70 is installed directly into a computer application for use with integrated circuits. Control signals from the computer will drive the optical source in phase-only filter package 70. Phase-only filter package 70 includes a phase-only filter, as described above in reference to package 50, such that the output of phase-only filter package 70 can be connected to a multimode fiber without risk of signal error from mode selective loss elements.

Although the present invention has been described with reference to preferred embodiments, workers skilled in the art will recognize that changes may be made in form and detail without departing from the spirit and scope of the invention.

What is claimed is:

1. An optical transmission system comprising:

an optical source generating an optical signal having a predetermined wavelength;

a multimode optical waveguide having predetermined dimensions receiving the optical signal from the optical source and having multiple modes; and a phase-only filter between the optical source and the multimode optical waveguide, the optical signal passing through the phase-only filter, the phase-only filter exciting a plurality of modes in the optical waveguide to approximate equilibrium modal power distribution as the optical signal is received into the optical waveguide.

2. The optical transmission system of claim 1 wherein the systems further comprises mode selective loss elements acting on the optical signal after the signal passes through the phase-only filter.

3. The optical transmission system of claim 1 wherein the phase-only filter is configured based at least on the wavelength of the optical signal and the dimensions of the optical waveguide.

4. The optical transmission system of claim 1 wherein the phase-only filter comprises a grating surface.

5. An optical transmission system comprising:

an optical source generating an optical signal having a predetermined wavelength;

a first lens receiving the optical signal from the optical source;

a second lens;

a multimode optical waveguide having predetermined dimensions receiving the optical signal from the second lens and having multiple modes;

a phase-only filter between the first and second lens, the optical signal passing through the phase-only filter from the first lens to the second lens, the phase-only filter exciting a plurality of modes in the optical waveguide to approximate equilibrium modal power distribution as the optical signal is received into the optical waveguide; and a detector for detecting the optical signal in the multimode optical waveguide after the signal has passed through the phase-only filter.

6. The optical transmission system of claim 5 wherein the phase-only filter is configured based at least on the wavelength of the optical signal and the dimensions of the optical waveguide.

7. The optical transmission system of claim 5 wherein the phase-only filter comprises a grating surface.

8. A fiber optic mode scrambler comprising:

a first lens receiving an optical signal having a predetermined wavelength;

a phase-only filter receiving the optical signal from the first lens;

a second lens receiving the optical signal from the phase only filter;

a multimode optical waveguide having predetermined dimensions receiving the optical signal from the second lens, wherein the phase only filter is configured based at least on the wavelength of the optical signal and the dimensions of the optical waveguide such that the phase only filter excites a large number of modes in the optical waveguide to approximate equilibrium modal power distribution as the optical signal is received into the optical waveguide; and a detector for detecting the optical signal in the multimode optical waveguide.

9. The fiber optic mode scrambler of claim 8 wherein the phase-only filter comprises a grating surface.

10. A method for improving an optical signal being transmitted through an optical waveguide, the method comprising:

receiving an optical signal of a predetermined wavelength;

guiding the optical signal through an optical phase-only filter; and guiding the optical signal into a waveguide, the waveguide having a predetermined number of transmission modes, wherein the optical phase-only filter provides the optical signal into multiple transmission modes of the optical waveguide.

11. The method for improving an optical signal of claim 10 wherein the optical filter is configured based on the wavelength of the optical signal and on the dimensions of the waveguide.

12. The method of claim 10 wherein the phase-only filter comprises a grating surface.

* * * * *